United States Patent
Perpetuo Correa et al.

(10) Patent No.: US 10,523,123 B2
(45) Date of Patent: Dec. 31, 2019

(54) METHOD FOR ACTUATING A MULTI-PHASE SYNCHRONOUS CONVERTER

(71) Applicant: AVL LIST GmbH, Graz (AT)

(72) Inventors: Tomas Perpetuo Correa, Ourenta (PT); Roland Greul, Graz (AT); Oliver König, Graz (AT)

(73) Assignee: AVL LIST GmbH, Graz (AT)

( * ) Notice: Subject to any disclaimer, the term of this patent is extended or adjusted under 35 U.S.C. 154(b) by 0 days.

(21) Appl. No.: 15/764,740

(22) PCT Filed: Sep. 30, 2016

(86) PCT No.: PCT/EP2016/073405
§ 371 (c)(1),
(2) Date: Mar. 29, 2018

(87) PCT Pub. No.: WO2017/055534
PCT Pub. Date: Apr. 6, 2017

(65) Prior Publication Data
US 2018/0278179 A1    Sep. 27, 2018

(30) Foreign Application Priority Data
Oct. 1, 2015 (AT) .................................. 50829/2015

(51) Int. Cl.
*H02M 3/158* (2006.01)
*H02M 1/00* (2006.01)

(52) U.S. Cl.
CPC .. *H02M 3/1584* (2013.01); *H02M 2001/0032* (2013.01)

(58) Field of Classification Search
CPC . H02M 2001/0032; H02M 2001/0035; H02M 3/1584
See application file for complete search history.

(56) References Cited

U.S. PATENT DOCUMENTS

| 6,281,666 B1 | 8/2001 | Tressler et al. |
| 2005/0063205 A1 | 3/2005 | Stancu et al. |

(Continued)

FOREIGN PATENT DOCUMENTS

| CN | 102868313 A | 1/2013 |
| DE | 102013107792 A1 | 1/2015 |
| EP | 2439837 A1 | 4/2012 |

OTHER PUBLICATIONS

Austrian Search Report Application No. A 50829/2015 Completed: Jul. 18, 2016 1 page.

(Continued)

*Primary Examiner* — Fred E Finch, III
*Assistant Examiner* — Rafael O De León Domenech
(74) *Attorney, Agent, or Firm* — Whitmyer IP Group LLC (57) ABSTRACT

A multi-phase synchronous converter consisting of a plurality of half bridges which in turn consist of an upper power switch and a lower power switch, the converter being actuated by a pulse width modulation dependent on a predetermined pulse duty cycle in the range of zero to one hundred percent. The multi-phase synchronous converter generates an output current and is operated in a normal mode in which the power switches switch with a normal switching period defined by a predetermined normal switching frequency, and a normal pulse duration dependent on the actual pulse duty cycle. As soon as the pulse duty cycle exceeds an upper duty cycle threshold or falls below a lower duty cycle threshold, the multi-phase synchronous converter is switched from the normal mode into an operating mode in which at least one of the power switches of at least one half bridge is deactivated.

12 Claims, 4 Drawing Sheets

(56) References Cited

U.S. PATENT DOCUMENTS

| | | |
|---|---|---|
| 2006/0221656 A1 | 10/2006 | Meguro et al. |
| 2011/0254526 A1* | 10/2011 | Luo .................... H02M 3/1584 323/284 |
| 2012/0146567 A1* | 6/2012 | Iwaji ...................... H02P 29/02 318/504 |
| 2013/0229829 A1 | 9/2013 | Zhang et al. |
| 2014/0070785 A1* | 3/2014 | Galloway ........... H02M 3/1582 323/285 |
| 2016/0099639 A1* | 4/2016 | Leisten ............... H02M 3/3376 323/271 |

OTHER PUBLICATIONS

PCT International Search Report and Written Opinion of the International Searching Authority Application No. PCT/EP2016/073405 Completed: Feb. 7, 2017; dated Feb. 23, 2017 12 Pages.

* cited by examiner

METHOD FOR ACTUATING A MULTI-PHASE SYNCHRONOUS CONVERTER

TECHNICAL FIELD

The present teachings relate to a method for actuating a multi-phase synchronous converter, consisting of a plurality of half bridges which in turn consist of an upper power switch and a lower power switch, respectively, by means of pulse width modulation dependent on a predetermined pulse duty cycle in the range from zero to one hundred percent, wherein the synchronous converter generates an output current and the multi-phase converter is operated in a normal mode, in which the power switches switch with a normal switching period defined by a predetermined normal switching frequency and a normal pulse duration, the normal pulse duration being dependent on the current pulse duty cycle.

BACKGROUND

Various direct voltage converters, which are sometimes also called direct voltage transformers, are known in order to convert direct voltages in other direct voltage ranges. For certain applications, such as for battery charging devices or battery test devices, powerful direct voltage converters are required, which may also be operated in a bidirectional way. A possible implementation of a bidirectional direct voltage converter is represented by a synchronous converter, which represents a step-down-converter, i.e. which converts input voltages into output voltages, which are smaller or at most equal to the input voltages, or vice-versa. To this end, a half bridge is used, wherein the two power switches of the half bridge are actuated by a pulse width modulation control unit (PWM control unit), in a way that the power switches switch within a switching period, which is defined by the predetermined switching frequency, alternately actuated with inverted switching pulses. Thus, basically, one power switch of a half bridge is always conductive, while the other one is disabled. The value of the output voltage of the synchronous converter is set by targeting of the duty cycle of the PWM control unit. The duty cycle indicates the ratio of the pulse duration of the upper power switch of a half bridge to the switching period. These synchronous converters may also be implemented as multi-phase converters. In this embodiment, as known, a plurality of half bridges, respectively being provided with two power switches, are connected in parallel via the output inductors of the half bridges and are actuated, in sequence, by the PWM control unit. Thus, the power switches are usually actuated with a cycle offset, which is equal to a fraction of the switching period, primarily for reducing output current ripples. The output current in multi-phase synchronous converters is determined with a fixed sampling rate. In order to ensure that the sampling points respectively fall on the current average values, the cycling of the power switches occurs with an offset corresponding to the switching period duration divided by the number of half bridges. With multi-phase actuation, larger output currents may be generated with smaller current ripples, or the switching frequency of the sum output current of such a multi-phase converter may be reduced, thus allowing a simpler filter sizing. Last but not least, in a multi-phase converter, smaller capacitors may be used for the same power range.

However, it is known that the upper and lower power switch of a half bridge cannot be simultaneously switched to the conducting state, since the voltage input of the synchronous converter would otherwise be short-circuited. For this reason, it is not possible to switch both power switches of a half bridge simultaneously or immediately in sequence, since otherwise, for example due to switching delays in the nano/microseconds range, both switches would be at risk of being both, in a conductive state for a short time, thus short-circuiting the input. Remedy is provided in the form of dead times between the switching of the upper and lower power switch of a half bridge. Thus, it may be ensured that one switch is switched off before the other is switched on. By introducing dead times, a reduction of obtainable duty cycle is however always caused, since the obtainable minimum and maximum duty cycle and thus the minimum and maximum output voltage are thus limited. The covered voltage range of the synchronous converter is thus reduced in case of actuation with inverting PWM signals and it is impossible to output particularly small or large voltages. The actuation of the half bridge with inverting PWM signals is mainly for allowing the current within a pulse period to continuously switch between positive and negative values. Since in normal operation both power switches are always alternately switching, a high or low output voltage cannot be set or obtained in a precise way, since the voltage is influenced by the required pulses of the other power switch and the consequently generated dead times. Thus, no theoretical maximum or minimum possible voltage may be output on the output side, without causing a certain error. PWM controls are already known, which at least allow a duty cycle of 100 percent, although a gap is present at values slightly below 100 percent.

SUMMARY

One object of the present teachings is thus to expand the possible voltage range of a direct voltage converter.

This object is achieved in that switching from the normal mode into an operating mode is performed when the pulse duty cycle exceeds a first upper duty cycle or falls below a first lower duty cycle threshold, wherein in operating mode at least one of the power switches of at least one half bridge is permanently deactivated for a longer period of time than the normal switching period. Thus, the otherwise required dead time is eliminated, which may lead to a reduction of the duty cycle range and thus also of the voltage range.

If the output current is larger than a first positive output current threshold, or smaller than a first negative output current threshold, the synchronous converter may additionally be switched into a blocking mode, in which all lower power switches or all upper power switches, i.e. the respective power switches which, in the normal mode, would still contribute short pulses for each period and thus would additionally cause a dead time, are permanently deactivated. The term "deactivating" means that the respective power switch is permanently open and that no control pulses are applied thereto. Thus, only the pulse width of the opposed power switch of the half bridge determines the output voltage and no dead time has to be taken into account between the switching of the power switches of a half bridge. Since the normal switching period in blocking mode does not vary, the sampling period of the output current may be maintained.

In the extreme case, thus, in case of a positive output current, for example, the upper power switches (which are actuated with a temporal offset in the case of multi-phase synchronous converters) may be permanently switched, whereas all lower power switches during blocking mode are permanently deactivated and a duty cycle of a hundred percent is achieved. In the opposed extreme case, all upper power switches may be permanently deactivated, while all lower power switches are permanently switched (also with an offset, in the case of multi-phase synchronous converters), which yields a zero percent duty cycle. In case of a negative output current, the roles of the upper and lower power switches are reversed.

If in case of low output currents, all upper or all lower power switches were blocked, then a zero crossing of the output current would not be possible. If for example a positive output current is flowing, then, in blocking mode, only the upper power switches are switched. If, however, the lower power switches are deactivated, no current change from positive to negative direction may occur, since the energy in the inductance at the zero crossing of the output current is zero and the inversion of current direction into a negative output current only would take place when the lower power switch switches into conduction and the output voltage would drive the current through the lower power switch in the negative direction. The input voltage of a synchronous converter is larger than the output voltage. Thus, output current gaps occur around zero Ampere and oscillations may occur, for example, between the blocking mode for a positive current (deactivation of all lower power switches) and the blocking mode for a negative current (deactivation of all upper power switches). In case of duty cycles which are not low or not high, the normal mode has to be used instead of the blocking mode, in order to achieve a zero crossing of the output current. In case of low or high duty cycles, the normal mode once again gives rise to above mentioned problems regarding dead times, so that the desired duty cycles and output voltages cannot be reached.

A solution is provided, in this case, by a low current mode, which is activated in case of dropping below a second positive output current threshold and simultaneously exceeding a second negative output current threshold, when the output current is thus within a range around the zero crossing. In this low current mode, the power switches are alternately actuated with a switching period, which is increased by a factor z with respect to the sampling period.

Thus, the influence of dead times is reduced by the same factor z since switching is z-times less frequent. The exceeding of the first upper or lower duty cycle thresholds is assumed since the normal mode would otherwise be sufficient.

The pulse durations at least of the upper or lower power switches of a half bridge may additionally be increased by a factor m. The pulse duration increased by a factor m allows to take into account the required dead time in case of inverting switching of the half bridge. The result is that the pulse widths for very small output voltages are larger than the dead time, and may thus be output. In the end, a higher summed up total pulse duration is in fact obtained, over the individual pulses, which occur z times less often but with an m times larger width.

Advantageously in the low current mode, for example by means of an increase of the switching period, only one half bridge is thus switched within a sampling period, so that the multi-phase synchronous converter operates like a single-phase synchronous converter, wherein the half bridges that are switching change in each sampling period. The current ripples are small at lower output currents anyway, so the omission of a interleaved switching of the half bridges at higher switching periods does not entail drawbacks for the filtering of the output current ripple. Thus, in each sampling period, one respective half bridge may be switched alternately.

The factor z advantageously corresponds to the factor m, whereby, on one side, the same duty cycle as in the normal mode may be achieved, wherein, however, less frequent dead times occur at z=m. Moreover, it is ensured that the sampling period of the output current always hits the average value of the current active power switch to adjust the desired duty cycle.

In order to avoid oscillations between the low current mode and the blocking mode, hystereses may be generated between the first and second positive output current threshold or between the first and second negative current threshold.

When the synchronous converter is in the blocking mode, it may remain in the blocking mode, while the output current remains larger than a second positive output current threshold or smaller than a second negative output current threshold, depending on the polarity of the output current.

When the synchronous converter is in the low current mode, then the synchronous converter may remain in the low current mode if the output current remains smaller than the first positive output current threshold and larger than the first negative output current threshold.

If no hysteresis is desired, then the first and second negative output current thresholds or the first and second positive output current thresholds may respectively be set equal to each other.

As soon as the duty cycle crosses the upper duty cycle threshold or the lower duty cycle threshold while blocking mode or low current mode is active the synchronous converter is switched into the normal mode. The normal mode is thus active, when the upper duty cycle threshold is not exceeded upwards or the lower duty cycle threshold is not exceeded downwards. Regarding the duty cycle, oscillations may thus also occur between the normal mode and the blocking mode, or the low current mode, if the duty cycle oscillates around the upper or lower duty cycle threshold. In order to avoid these oscillations between the normal mode and the blocking mode, or the low current mode, a further hysteresis may be generated, in that at least one further duty cycle threshold is defined, which lies closer to a duty cycle of 50%, than the upper or lower duty cycle threshold. Only a crossing by the duty cycle of the further duty cycle threshold causes a switching to the normal mode while in active blocking mode, or low current mode. If the further duty cycle threshold lies between a duty cycle of 50% and the upper duty cycle threshold and if either the blocking mode or a low current mode is active, then, in case of a drop below the upper duty cycle threshold a switching to the normal mode does not occur yet, since it occurs only at the following drop below the further duty cycle threshold. If the further duty cycle threshold lies between a duty cycle of 50% and the lower duty cycle threshold, and if a blocking mode or a low current mode is active, then, a switching to the normal mode does not occur in case of exceeding the lower duty cycle threshold, but only when the further duty cycle threshold is exceeded. This effectively causes a hysteresis between the at least further duty cycle threshold and the upper duty cycle threshold or the lower duty cycle threshold. In conclusion, starting from the normal mode, if the duty cycle exceeds the upper duty cycle threshold or drops below the lower duty cycle threshold, this causes a switching into a blocking mode or into a low current mode. However, starting from the blocking or low current mode, only a crossing by the duty cycle of the further duty cycle threshold causes a switching into the normal mode.

A non-implementation of the further duty cycle threshold may also be interpreted as the case of the further duty cycle threshold coinciding with the upper or lower duty cycle threshold - whereby the further duty cycle threshold does not lie closer to a duty cycle of 50% than the upper or lower duty cycle threshold.

BRIEF DESCRIPTION OF THE DRAWINGS

The present teachings are explained in the following with reference to FIGS. 1 to 5, which show schematic and non-limiting advantageous embodiments of the present teachings. In particular

DETAILED DESCRIPTION

Figure 1:
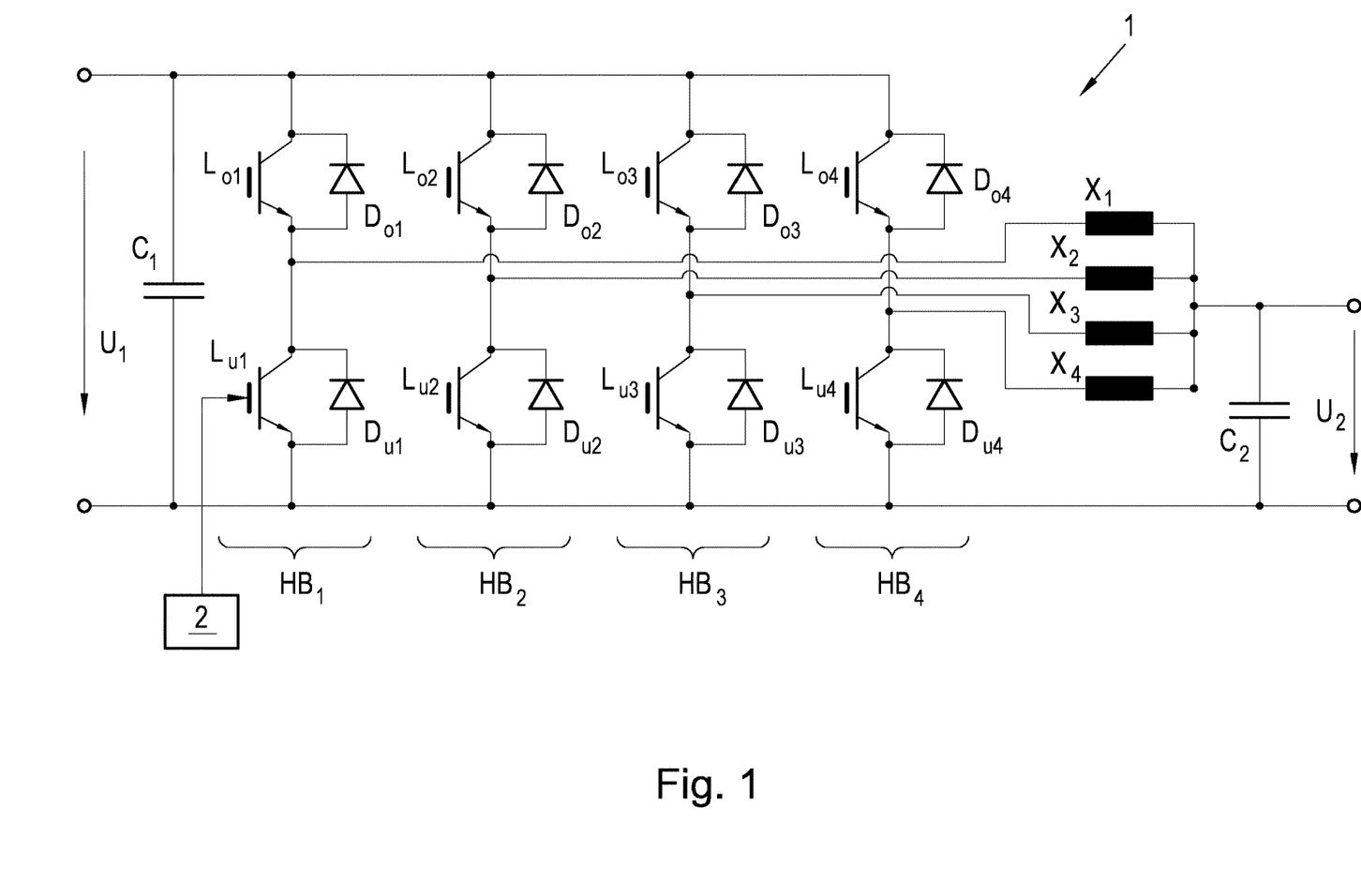
FIG. 1 shows the circuit structure of a four-phase synchronous converter.

In FIG. 1, a known multi-phase, in this case a four-phase, synchronous converter 1 according to the state of the art is shown. Notoriously, synchronous converters are bidirectional, however, in the following, the left side is indicated, for example, as the input side having an input voltage $U_1$ on input capacitance $C_1$ and the right side is identified as the output side, having an output voltage $U_2$ on output capacitance $C_2$. At the same time, as known, inductances $X_1$, $X_2$, $X_3$, $X_4$ (inductors) are provided on the individual phases, wherein the inductances $X_1$, $X_2$, $X_3$, $X_4$ are connected, on one side, between the upper and lower power switch with a respective half bridge $HB_1$, $HB_2$, $HB_3$, $HB_4$ and, on the other side, with each other. The inductances $X_1$, $X_2$, $X_3$, $X_4$ together with the output capacitance $C_2$ form an output filter of the synchronous converter 1.

The half bridges $HB_1$, $HB_2$, $HB_3$, $HB_4$ are composed of a respective upper power switch $L_{o1}$, $L_{o2}$, $L_{o3}$, $L_{o4}$ and a respective lower power switch $L_{u1}$, $L_{u2}$, $L_{u3}$, $L_{u4}$ and optional corresponding diodes $Do_1$, $D_{u1}$, $D_{o2}$, $D_{u2}$, $D_{o3}$, $D_{u3}$, $D_{o4}$, $D_{u4}$. A PWM control 2 (which is indicated only for power switch $L_{u1}$ in FIG. 1) actuates the half bridges $HB_1$, $HB_2$, $HB_3$, $HB_4$, or the power switches $L_{o1}$, $L_{o2}$, $L_{o3}$, $L_{o4}$, $L_{u1}$, $L_{u2}$, $L_{u3}$, $L_{u4}$ of half bridges $HB_1$, $HB_2$, $HB_3$, $HB_4$, in the normal mode $M_0$ in such a way, that within a normal switching period $T_0$ defined by a predetermined normal switching frequency, the half bridges $HB_1$, $HB_2$, $HB_3$, $HB_4$ are clocked with the normal switching period $T_0$, however with an offset equal to the normal switching period $T_0$/number of half bridges x. Thus, the upper power switches $L_{o1}$, $L_{o2}$, $L_{o3}$, $L_{o4}$ are switched into conduction with a temporal offset while the respective corresponding lower power switches $L_{u1}$, $L_{u2}$, $L_{u3}$, $L_{u4}$ of the corresponding half bridges $HB_1$, $HB_2$, $HB_3$, $HB_4$ are blocked. After a pulse duration $t_o$ of the upper power switches $L_{o1}$, $L_{o2}$, $L_{o3}$, $L_{o4}$, the previously conductively switched upper power switches $L_{o1}$, $L_{o2}$, $L_{o3}$, $L_{o4}$ are blocked and the previously blocked lower power switches $L_{u1}$, $L_{u2}$, $L_{u3}$, $L_{u4}$ are switched into conduction. After a pulse duration $t_u$ of the lower power switches $L_{u1}$, $L_{u2}$, $L_{u3}$, $L_{u4}$, these are again blocked and the upper $L_{o1}$, $L_{o2}$, $L_{o3}$, $L_{o4}$ are again switched into their conductive state. The roles of the upper and lower power switches $L_{o1}$, $L_{o2}$, $L_{o3}$, $L_{o4}$, $L_{u1}$, $L_{u2}$, $L_{u3}$, $L_{u4}$ of half bridges $HB_1$, $HB_2$, $HB_3$, $HB_4$ may of course also be inverted, for example if the output current direction is changed.

In order to avoid that the upper power switches $L_{o1}$, $L_{o2}$, $L_{o3}$, $L_{o4}$ and lower power switches $L_{u1}$, $L_{u2}$, $L_{u3}$, $L_{u4}$ of half bridges $HB_1$, $HB_2$, $HB_3$, $HB_4$ are simultaneously switched into conduction and thus the voltage input is short-circuited, after each normal pulse duration $t_o$, $t_u$, a dead time $T_t$ is provided between the on/off switching of the upper power switches $L_{o1}$, $L_{o2}$, $L_{o3}$, $L_{o4}$ and the on/off switching of the corresponding lower power switches $L_{u1}$, $L_{u2}$, $L_{u3}$, $L_{u4}$ of half bridges $HB_1$, $HB_2$, $HB_3$, $HB_4$ and vice-versa. The following understandable relationship is thus obtained: the sum of pulse durations $t_o$ of the upper power switches $L_{o1}$, $L_{o2}$, $L_{o3}$, $L_{o4}$ and of pulse durations $t_u$ of lower power switches $L_{u1}$, $L_{u2}$, $L_{u3}$, $L_{u4}$ plus double the dead time $T_t$ yields the normal switching period $T_0$. The duty cycle S describes the ratio between the pulse duration $t_o$ of the upper power switches $L_{o1}$, $L_{o2}$, $L_{o3}$, $L_{o4}$ and the normal switching period $T_0$. The ratio of the pulse durations $t_o$, of the upper power switches $L_{o1}$, $L_{o2}$, $L_{o3}$, $L_{o4}$ and the pulse durations $t_u$ of the lower power switches $L_{u1}$, $L_{u2}$, $L_{u3}$, $L_{u4}$ is thus determined by the PWM control 2 via the duty cycle S and the normal sampling period $T_0$.

For example, starting from duty cycles of 25%, for n=4 half bridges $HB_1$, $HB_2$, $HB_3$, $HB_4$, overlapping of pulse durations $t_o$, $t_u$ of upper power switches $L_{o1}$, $L_{o2}$, $L_{o3}$, $L_{o4}$ or lower power switches $L_{u1}$, $L_{u2}$, $L_{u3}$, $L_{u4}$ are obtained depending on the current direction.

The setting of the output voltage $U_2$ in synchronous converters is performed by the duty cycle S. A duty cycle S of 100 percent would thus mean (for a positive output current $I_a$) that the upper power switches $L_{o1}$, $L_{o2}$, $L_{o3}$, $L_{o4}$ are permanently switched in a conductive state, and the lower power switches $L_{u1}$, $L_{u2}$, $L_{u3}$, $L_{u4}$ of all half bridges $HB_1$, $HB_2$, $HB_3$, $HB_4$ are permanently blocked. This would cause a transfer of the input voltage $U_1$ to the output voltage $U_2$. A duty cycle S equal to zero percent would on the contrary entail that all lower power switches $L_{u1}$, $L_{u2}$, $L_{u3}$, $L_{u4}$ are permanently in the conductive state, and the upper power switches $L_{o1}$, $L_{o2}$, $L_{o3}$, $L_{o4}$ of all half bridges $HB_1$, $HB_2$, $HB_3$, $HB_4$ are permanently blocked i.e. permanently deactivated. This leads to an output voltage $U_2$ which is equal to zero. Since within a normal switching period $T_0$ due to the offset switching of the upper $L_{o1}$, $L_{o2}$, $L_{o3}$, $L_{o4}$ and the required pulses of the corresponding lower power switches $L_{u1}$, $L_{u2}$, $L_{u3}$, $L_{u4}$ and the thus twice required dead time $T_t$, the duty cycle S cannot be arbitrarily reduced or increased, these extreme duty cycles are usually impossible to achieve. In the normal mode $M_0$ the possible range of output voltages $U_2$ is thus limited.

Figure 2:
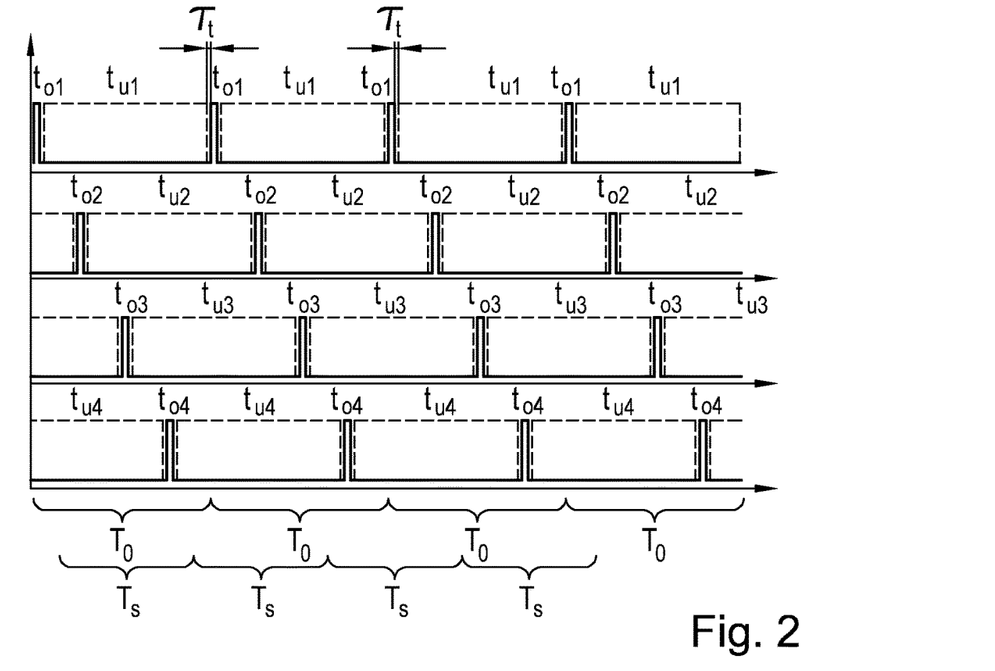
FIG. 2 shows switching diagrams of a multi-phase synchronous converter to normal mode $M_0$.

In FIG. 2, the switching diagram of power switches $L_{o1}$, $L_{o2}$, $L_{o3}$, $L_{o4}$, $L_{u1}$, $L_{u2}$, $L_{u3}$, $L_{u4}$ is shown, wherein each of the four half bridges $HB_1$, $HB_2$, $HB_3$, $HB_4$ is clocked with an offset equal to the normal switching period $T_0$ divided by the number x of half bridges, in this case $T_0/4$. The sampling period $T_S$ of the output current $I_a$ is set so that at the time of sampling a current branch conducts the actual current average value, which is ensured by the relationship $T_S=T_0*i/(2*x)$. In this case, x represents the number of half bridges $HB_1$, $HB_2$, $HB_3$, $HB_4$, and i is a natural number from 1 to 2x. The sampled output current value is required by the PWM control 2 for actuating the synchronous converter 1. A relatively low duty cycle S is represented, i.e. the pulse durations $t_o$ of the upper power switches $L_{o1}$, $L_{o2}$, $L_{o3}$, $L_{o4}$ are considerably lower than the pulse durations $t_u$ of the lower power switches $L_{u1}$, $L_{u2}$, $L_{u3}$, $L_{u4}$. The dead time $T_t$ is respectively visible between the individual pulses. The minimum pulse duration $t_o$ of the upper power switches $L_{o1}$, $L_{o2}$, $L_{o3}$, $L_{o4}$ in a normal switching period $T_0$ is thus limited by the minimum required pulse duration $t_o$ of the upper power switches $L_{o1}$, $L_{o2}$, $L_{o3}$, $L_{o4}$ and by twice the length of the dead time $T_t$. The minimum pulse durations $t_o$, $t_u$ of all power switches $L_{o1}$, $L_{o2}$, $L_{o3}$, $L_{o4}$, $L_{u1}$, $L_{u2}$, $L_{u3}$, $L_{u4}$ approximately lie in the order of magnitude of the dead time $T_t$. Thus, the linear range of duty cycle S and thus the minimum output voltage is approximately limited by three times the dead time $T_t$. In case of a high duty cycle S or in case of a negative output current $I_a$ the same problem but with inverted roles of upper power switches $L_{o1}$, $L_{o2}$, $L_{o3}$, $L_{o4}$ and lower power switches $L_{u1}$, $L_{u2}$, $L_{u3}$, $L_{u4}$ is encountered.

In order to expand the range of the output voltage $U_2$, i.e. the duty cycle to the otherwise unachievable values slightly below 100% or just above 0%, according to the present teachings, as soon as the duty cycle S exceeds an upper duty cycle threshold $S_{o1}$ or drops below a lower duty cycle threshold $S_{u1}$, a switching from the normal mode $M_0$ into an operating mode $M_1$, $M_2$, $M_3$ takes place, in which at least one of the power switches $L_{o1}$, $L_{u1}$, $L_{o2}$, $L_{u2}$, $L_{o3}$, $L_{u3}$, $L_{o4}$, $L_{u4}$ of at least one half bridge $HB_1$, $HB_2$, $HB_3$, $HB_4$ is permanently deactivated over a period which is greater than the normal switching period $T_0$. "Deactivated" means that the power switch does not provide any pulses, i.e. it is open, and thus that the switching duration of the opposite power switch is not reduced by any dead time. Thus, compared to the normal mode $M_0$, within a period corresponding to the normal switching period $T_0$, the dead time $T_t$, which would limit the voltage range, is saved approximately at least three times.

Figure 4:
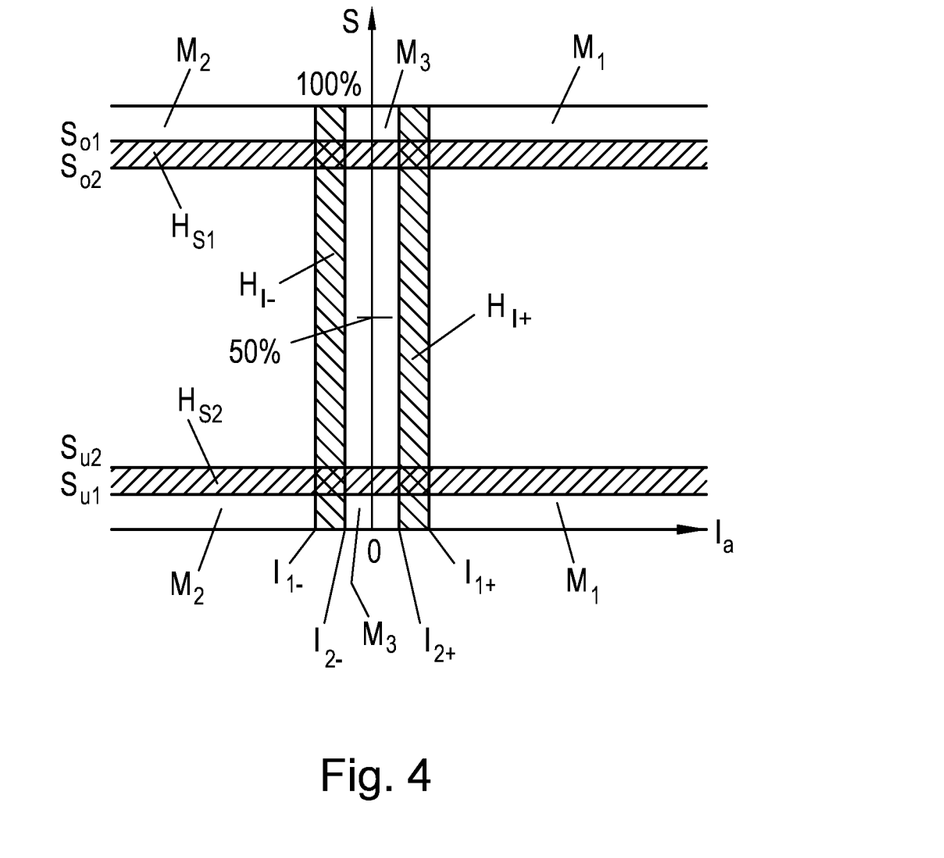
FIG. 4 shows a representation of the possible operating modes $M_0$, $M_1$, $M_2$, and $M_3$.

In order to describe the exemplary operating modes $M_1$, $M_2$, $M_3$, in the following two blocking modes $M_1$, $M_2$, and a low current mode $M_3$ are to be distinguished as operating modes (FIG. 4).

If the output current $I_a$ is greater than a first positive output current threshold $I_{1+}$ or smaller than a first negative output current threshold $I_{1-}$ (FIG. 4), the synchronous converter 1 can be switched into a blocking mode $M_1$, $M_2$, in which all lower power switches $L_{u1}$, $L_{u2}$, $L_{u3}$, $L_{u4}$ (at $I_a>I_{1+}$) or all the upper power switches $L_{o1}$, $L_{o2}$, $L_{o3}$, $L_{o4}$ (at $I_a<I_{1-}$) are permanently disabled as long as the multi-phase synchronous converter 1 is in the blocking mode $M_1$, $M_2$. To this end, as mentioned above, the output voltage $U_2$ desired by the synchronous converter 1 requires a duty ratio greater than the first upper duty cycle threshold $S_{o1}$ or smaller than the first lower duty cycle threshold $S_{u1}$.

If, therefore, the upper or lower duty cycle threshold $S_{o1}$, $S_{u1}$ has been exceeded or undercut, respectively, and the output current $I_a$, for example, exceeds the first positive output current threshold $I_{1+}$, then all lower power switches $L_{u1}$, $L_{u2}$, $L_{u3}$, $L_{u4}$ of all half bridges $HB_1$, $HB_2$, $HB_3$, $HB_4$ are permanently disabled, resulting in the blocking mode $M_1$. The upper power switches $L_{o1}$, $L_{o2}$, $L_{o3}$, $L_{o4}$ continue to switch into conduction with an offset equal to the normal switching period $T_0$ divided by the number of half bridges $HB_1$, $HB_2$, $HB_3$, $HB_4$ with a pulse duration depending on the desired duty cycle S. However, now there is the advantage that higher and lower pulse durations $t_0$ and thus higher and lower duty cycles S than in the normal mode $M_0$ are enabled. Since the lower power switches $L_{u1}$, $L_{u2}$, $L_{u3}$, $L_{u4}$ do not switch in blocking mode $M_1$, no dead times $T_t$ are required and the pulse durations to are not limited.

If the upper duty cycle threshold $S_{o1}$ has been exceeded, a high output voltage $U_2$ is desired. This output voltage $U_2$ can be arbitrarily set, for a positive output current $I_a$ by varying the pulse durations $t_0$ of the upper power switches $L_{o1}$, $L_{o2}$, $L_{o3}$, $L_{o4}$. It is thus also possible to obtain a duty cycle S in a range just below one hundred percent, which would mean that the upper power switches $L_{o1}$, $L_{o2}$, $L_{o3}$, $L_{o4}$ are almost permanently (in the case of a multi-phase synchronous converter 1 again with an offset) or permanently switched. In any case, the limitation due to twice the dead time $T_t$ and the minimum pulse duration $t_u$ (which usually corresponds approximately to a dead time $T_t$) of the lower power switches $L_{u1}$, $L_{u2}$, $L_{u3}$, $L_{u4}$ is no longer present. Thus, a higher output voltage $U_2$ can be achieved. For small duty cycles S, an analogous situation applies.

If the duty cycle has fallen below the lower duty cycle threshold $S_{u1}$, all the lower power switches $L_{u1}$, $L_{u2}$, $L_{u3}$, $L_{u4}$ of all half bridges $HB_1$, $HB_2$, $HB_3$, $HB_4$ are also permanently deactivated. This also eliminates dead times $T_t$ and the pulse durations of the upper power switches $L_{o1}$, $L_{o2}$, $L_{o3}$, $L_{o4}$ can be selected arbitrarily small (up to a pulse duration $t_0$ on the order of the dead time $T_t$ and even up to a zero pulse duration). Thus, small duty cycles S are possible without the influence of both dead times $T_t$ or disturbing pulses by the lower power switches $L_{u1}$, $L_{u2}$, $L_{u3}$, $L_{u4}$.

If, however, the output current $I_a$ undershoots the first negative output current threshold $I_{1-}$, then all the upper power switches $L_{o1}$, $L_{o2}$, $L_{o3}$, $L_{o4}$ of all half bridges $HB_1$, $HB_2$, $HB_3$, $HB_4$ are permanently deactivated, which leads to blocking mode $M_2$. In this blocking mode $M_2$, the lower power switches $L_{u1}$, $L_{u2}$, $L_{u3}$, $L_{u4}$ continue switching with an offset and with pulse durations $t_u$ depending on the desired duty cycle S. Thus, even with negative output current $I_a$, high and low duty cycles S are possible because the upper power switches $L_{o1}$, $L_{o2}$, $L_{o3}$, $L_{o4}$ do not switch, and there are no dead times $T_t$. Compared to the previously mentioned blocking mode $M_1$, i.e. with a positive output current $I_a$, in blocking mode $M_2$, therefore, with a negative output current $I_a$, the roles of the upper power switches $L_{o1}$, $L_{o2}$, $L_{o3}$, $L_{o4}$ and lower power switches $L_{u1}$, $L_{u2}$, $L_{u3}$, $L_{u4}$ are reversed.

For small output currents $I_a$, i.e. if the output current $I_a$ is less than the second positive output current threshold $I_{2+}$ and greater than the second negative output current threshold $I_{2-}$, that is, if the output current $I_a$ is in a range around the zero current crossing, the synchronous converter 1 can be switched to a low current operating mode $M_3$. In this case, the power switches $L_{11}$, $L_{12}$, $L_{21}$, $L_{22}$, $L_{31}$, $L_{32}$, $L_{41}$, $L_{42}$ are switched with a switching period $T_3$ which corresponds to the normal switching period $T_0$ increased by a factor z. This means that the half bridges $HB_1$, $HB_2$, $HB_3$, $HB_4$ are not clocked with the normal switching period $T_0$ as in the normal mode $M_0$. In other words, within a period corresponding to the normal switching period $T_0$, not all the half bridges $HB_1$, $HB_2$, $HB_3$, $HB_4$ undergo a switching-over phase, i.e. not all upper power switches $L_{o1}$, $L_{o2}$, $L_{o3}$, $L_{o4}$ and lower power switches $L_{u1}$, $L_{u2}$, $L_{u3}$, $L_{u4}$ change state by switching from a conductive to a blocked state and vice-versa. It follows that, with a factor z of at least two, within a period corresponding to the normal switching period $T_0$ at least one of the power switches $L_{11}$, $L_{12}$, $L_{21}$, $L_{22}$, $L_{31}$, $L_{32}$, $L_{41}$, $L_{42}$ is deactivated, although it would switch in the normal mode $M_0$.

Advantageously, the factor z may be chosen to satisfy the relation $z=x/i$, where i represents a value from 1 to x−1, and x represents the number of half bridges. Furthermore, only one half bridge $HB_1$, $HB_2$, $HB_3$, $HB_4$ per sampling period $T_S$ may be switched, which can be achieved, for example, by a suitable choice of factor z and thus of switching period $T_3$.

Figure 3:
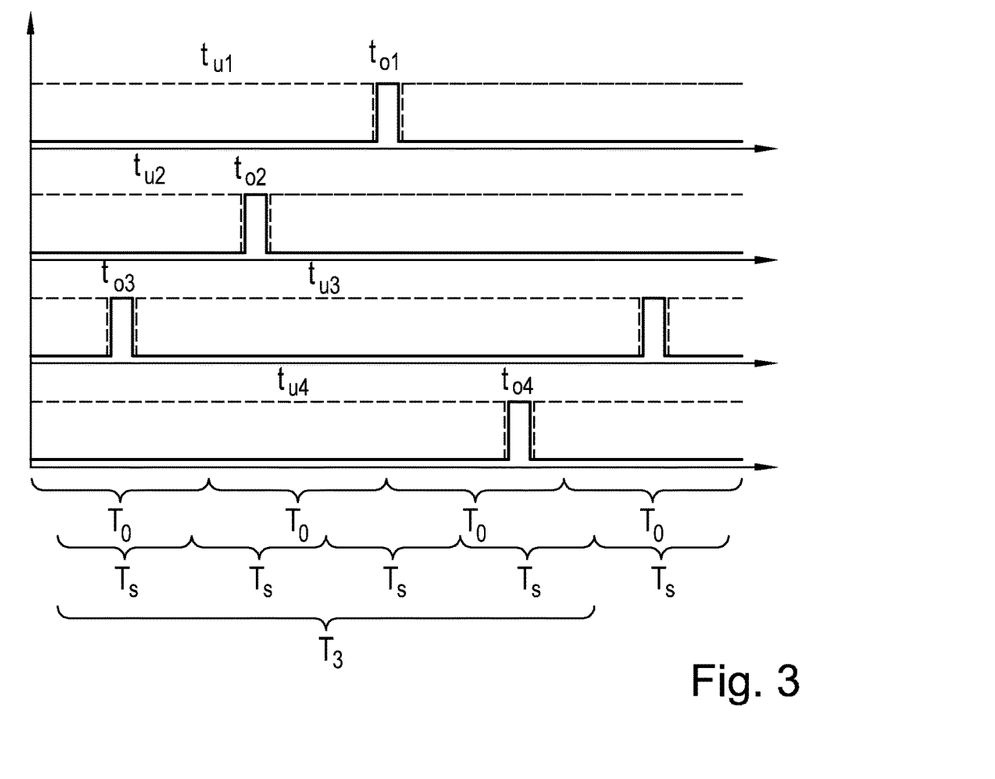
FIG. 3 shows switching diagrams of a multi-phase synchronous converter to the low current mode $M_3$.

In order to schematically explain the situation, reference is made to FIG. 3. The switching period $T_3$ in this example corresponds to z=4 times the sampling period $T_S$ (with x=4, i=1). Thus, for example, with a sampling period $T_S$ of ¾$T_0$, this yields a switching period $T_3$ of 3$T_0$ and this means that only one third of dead times $T_t$ occurs within the same period of time. In the low current mode $M_3$, only eight dead times $T_t$ are present within the switching period $T_3=3*T_0$. For comparison, according to FIG. 2, within the same period of time, 3 times as many, i.e. 24 dead times $T_t$ are to be taken into account in the normal mode $M_0$. Within a normal switching period $T_0$, in low-current mode $M_3$, at least one of the power switches $L_{o1}$, $L_{u1}$, $L_{o2}$, $L_{u2}$, $L_{o3}$, $L_{u3}$, $L_{o4}$, $L_{u4}$ is always deactivated, which would be active in the normal mode $M_0$. In the first normal switching period $T_0$, this applies to power switches $L_{o1}$, $L_{o2}$, $L_{o4}$, in the second normal switching period $T_0$ to power switches $L_{o1}$, $L_{o3}$, $L_{o4}$, etc.

Advantageously, in the low current mode $M_3$, the pulse durations $t_o$, $t_u$ of power switches $L_{o1}$, $L_{u1}$, $L_{o2}$, $L_{u2}$, $L_{o3}$, $L_{u3}$, $L_{o4}$, $L_{u4}$ can simultaneously be increased by a factor of m. The pulse durations $t_0$, $t_u$ increased by the factor m also allow smaller output voltages $U_2$ at very low duty cycles S, since the relationship between pulse durations $t_0$, $t_u$ and dead time is improved by a factor of m, for example. Overall, a higher summed total pulse duration over the individual pulse durations $t_0$, $t_u$ is achieved, wherein pulses occur z times less often, but are m times wider.

The factor m may be chosen equal to factor z, which results in the same duty cycle S (i.e. the same sum of all pulse durations within a normal switching period $T_0$) as in the normal mode $M_0$, thus ensuring that the samplings of the output current $I_a$ occur at a time where one phase lies within the average current value. This also results in the sampling of the output current $I_a$ in the low-current mode $M_3$ not requiring to be changed.

In order to avoid oscillations between the blocking modes $M_1$, $M_2$ and the low current mode $M_3$, a hysteresis $H_{I+}$ between the first positive output current threshold $I_{1+}$ and the second positive output current threshold $I_{2+}$ and a hysteresis $H_{I-}$ between the first negative output current threshold $I_{1-}$ and the second negative output current threshold $I_{2-}$ may be respectively provided. It has to be ensured that the first positive output current threshold $I_{1+}$ is greater than the second positive output current threshold $I_{2+}$, or the first negative output current threshold $I_{1-}$ is smaller than the second negative output current threshold $I_{2-}$.

If, in active blocking mode $M_1$, $M_2$ (i.e. the first positive output current threshold $I_{1+}$ has been exceeded or the first negative output current threshold $I_{1-}$ has been undershot), the output current $I_a$ is greater than a second positive output current threshold $I_{2+}$ or smaller than a second negative output current threshold $I_{2-}$, then the synchronous converter 1 can remain in the respective blocking mode $M_1$, $M_2$, according to the associated hysteresis $H_{I-}$, $H_{I+}$.

If the output current $I_a$ thus crosses the second positive output current threshold $I_{2+}$ or the second negative output current threshold $I_{2-}$, when the blocking mode $M_1$, $M_2$ is active, and the output current $I_a$ thus approaches a value of zero, the low current mode $M_3$ is activated.

In the low current mode $M_3$ (i.e., the output current has exceeded the second negative output current threshold $I_{2-}$, or has fallen below the second positive output current threshold $I_{2+}$) if the output current $I_a$ remains smaller than the first positive output current threshold $I_{1+}$ and larger than the first negative output current threshold $I_{1-}$, the synchronous converter can thus remain in the low current mode $M_3$.

If the output current $I_a$ thus crosses in the low current mode $M_3$ the first positive output current threshold $I_{1+}$ or the first negative output current threshold $I_{1-}$, the low-current mode is deactivated and the blocking mode $M_1$ or $M_2$ is activated depending on the current direction.

If the first positive output current threshold $I_{1+}$ corresponds to the second positive output current threshold $I_{1+}$ and/or the first negative output current threshold $I_{1-}$ corresponds to the second negative output current threshold $I_{2-}$, then a hysteresis $H_{I+}$, or $H_{I-}$ is omitted.

Once in the active blocking mode $M_1$, $M_2$ or in the low current mode $M_3$, the duty cycle S crosses the upper duty cycle threshold $S_{o1}$ or the lower duty cycle threshold $S_{u1}$, then the synchronous converter 1 is switched into the normal mode $M_0$.

In order to also prevent oscillations between the normal mode $M_0$ and the operating modes $M_1$, $M_2$, $M_3$, at least one further hysteresis $H_{S1}$, $H_{S2}$ may be provided. For this purpose, at least one further duty cycle threshold $S_{o2}$, $S_{u2}$ is provided, which is closer to a duty cycle of S=50% than the upper duty cycle threshold $S_{o1}$ and the lower duty cycle threshold $S_{u1}$. After the duty cycle S crosses the further duty cycle threshold $S_{o2}$, $S_{u2}$ in blocking mode ($M_1$, $M_2$) or low-current mode ($M_3$), the synchronous converter is switched to the normal mode $M_0$.

The possible operating states and realizable hystereses $H_{I+}$, $H_{I-}$, $H_{S2}$, $H_{S1}$, as well as possible output current thresholds $I_{1-}$, $I_{2-}$, $I_1+$, $I_{2+}$ and duty cycle thresholds $S_{o1}$, $S_{o2}$, $S_{u1}$, $S_{u2}$ are plotted in FIG. 4 as a function of output current $I_a$ and duty cycle S.

Figure 5:
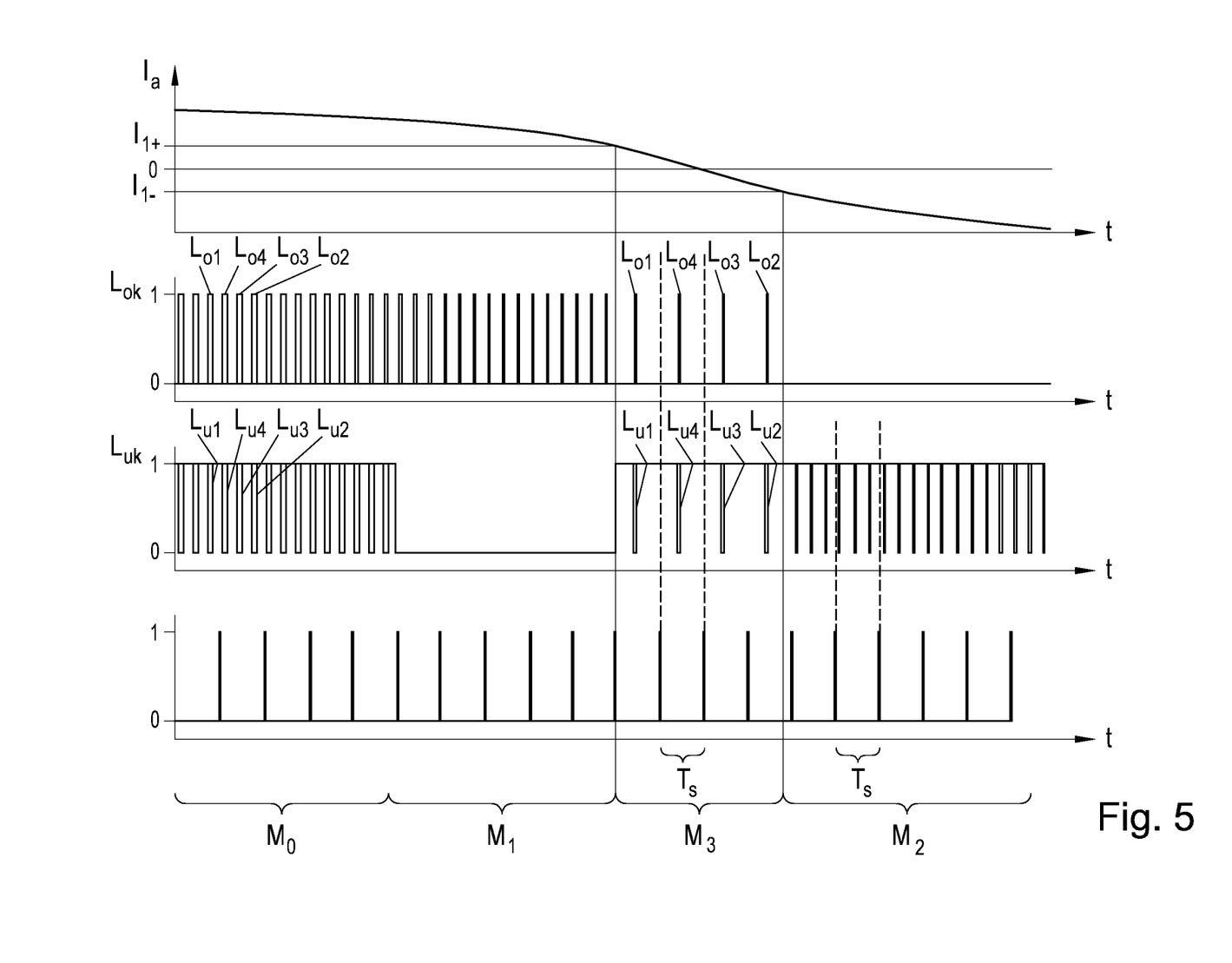
FIG. 5 shows switching diagrams of the transition from the normal mode to operating modes $M_0$, $M_1$, $M_3$, $M_2$ and a corresponding output current characteristic curve having a zero crossing.

FIG. 5 shows a profile of the output current $I_a$ passing through zero crossing and thus the transition from the normal mode $M_0$ initially into blocking mode $M_1$, then in low current mode $M_3$ and still further into blocking mode $M_2$. In normal mode $M_0$, all power switches $L_{o1}$, $L_{u1}$, $L_{o2}$, $L_{u2}$, $L_{o3}$, $L_{u3}$, $L_{o4}$, $L_{u4}$ are switched according to a prior art PWM control 2. Further, since the duty cycle S decreases and the output current $I_a$ is positive and sufficiently high, the blocking mode $M_1$ is activated by deactivating the lower power switches $L_{u1}$, $L_{u2}$, $L_{u3}$, $L_{u4}$. When the output current $I_a$ approaches the zero crossing, the low current mode $M_3$ is activated while the duty cycle S remains low. In this mode, all power switches $L_{o1}$, $L_{u1}$, $L_{o2}$, $L_{u2}$, $L_{o3}$, $L_{u3}$, $L_{o4}$, $L_{u4}$ switch on again. However, as can be clearly seen, the switching period $T_3$ has been increased z times (here four times) with respect to the sampling period $T_S$. Likewise, the pulse durations $t_o$, $t_u$ were increased m times. It should be noted that the sampling points (lowest diagram) of the synchronous converter 1 remain unchanged, i.e. the sampling rate $T_S$ does not change even in the low current mode $M_3$. The sum of the pulse durations $t_0$, $t_u$ in the low current mode $M_3$ still correspond to the sum of the pulse durations $t_0$, $t_u$ in the normal mode $M_0$, while the sampling rate $T_S$ remains the same, whereupon the duty cycle S can be determined. After the (negative) output current $I_a$ has become large enough, switching from low current mode $M_0$ to blocking mode $M_2$ takes place, since the duty cycle S is still sufficiently small. This means according to the present teachings that all upper power switches $L_{o1}$, $L_{o2}$, $L_{o3}$, $L_{o4}$ are permanently deactivated.

The invention claimed is:
1. A method for controlling a multi-phase synchronous converter having a plurality of half bridges, each half bridge includes an upper power switch and a lower power switch, the method comprising:

by a pulse width modulation dependent on a predetermined pulse duty cycle in the range of zero to one hundred percent, wherein the multi-phase synchronous converter generates an output current and the multi-phase synchronous converter is operated in a normal mode, in which the power switches switch with a normal switching period defined by a predetermined normal switching frequency and a normal pulse duration, the normal pulse duration being dependent on the actual pulse duty cycle, wherein the multi-phase synchronous converter is switched from the normal mode into an operating mode when the pulse duty cycle exceeds an upper duty cycle threshold or falls below a lower duty cycle threshold, wherein in the operating mode, at least one of the power switches of at least one of the plurality of half bridges is deactivated for a period of time longer than the normal switching period in the operating mode, wherein a second positive output current threshold and a second negative output current threshold are provided, wherein the output current is sampled with a sampling period, and that, the multi-phase synchronous converter is switched into an operating low current mode when the output current is smaller than the second positive output current threshold and larger than the second negative output current threshold, and wherein in the operating low current mode, the power switches are switched with a switching period, which corresponds to the sampling period increased by a factor z, wherein z is larger than 1 and smaller than or equal to x, where x is the number of half bridges.

2. The method according to claim 1, wherein the multi-phase synchronous converter is switched into a blocking mode when the output current is larger than a first positive output current threshold or smaller than a first negative output current threshold, the blocking mode being a part of the operating mode, wherein all lower power switches or all upper power switches are deactivated, as long as the multi-phase synchronous converter is in the blocking mode.

3. The method according to claim 1, wherein in the low current mode, a pulse duration of at least the upper or the lower power switches is increased.

4. The method according to claim 1, wherein within the sampling period of output current, only the power switches of at least one of the plurality of half bridges are switched.

5. The method according to claim 3, wherein in the low current mode, the pulse duration is increased by the factor z.

6. The method according to claim 2, wherein, the synchronous converter remains in the blocking mode if the output current remains larger than a second positive output current threshold or smaller than a second negative output current threshold.

7. The method according to claim 1, wherein, the synchronous converter remains in the low current mode if the output current remains smaller than the one first positive output current threshold and larger than the first negative output current threshold.

8. The method according to claim 6, wherein the first positive output current threshold corresponds to the second positive output current threshold and/or that the first negative output current threshold corresponds to the second negative output current threshold.

9. The method according to claim 2, wherein, when the pulse duty cycle crosses the upper duty cycle threshold or the lower duty cycle threshold while the synchronous converter is in the blocking mode, the synchronous converter is switched into the normal mode.

10. The method according to claim 2, wherein at least one further duty cycle threshold is provided, the at least one further duty cycle being closer to 50% than the upper duty cycle threshold or the lower duty cycle threshold, and wherein, while the synchronous converter is in the blocking mode or the low current mode, the synchronous converter is switched into the normal mode when the duty cycle crosses the second duty cycle threshold.

11. The method according to claim 1, wherein controlling the power switches between the normal mode and the operating mode provides a direct voltage to be converted into another direct voltage.

12. A method for controlling a multi-phase synchronous converter having a plurality of half bridges, each half bridge includes an upper power switch and a lower power switch, the multi-phase synchronous converter generates an output current, wherein the method comprises:

using a pulse width modulation control dependent on a predetermined pulse duty cycle in the range of zero to one hundred percent;

operating the multi-phase synchronous converter in a normal mode, wherein the power switches switch with a normal switching period defined by a predetermined normal switching frequency and a normal pulse duration, the normal pulse duration being dependent on the actual pulse duty cycle;

adjusting the multi-phase synchronous converter from the normal mode into an operating mode when the pulse duty cycle exceeds an upper duty cycle threshold or falls below a lower duty cycle threshold, wherein at least one of the power switches of at least one of the plurality of half bridges is deactivated for a period of time longer than the normal switching period in the operating mode;

providing a second positive output current threshold and a second negative output current threshold to said pulse width modulation control; and measuring the output current with a sampling period, and adjusting the multi-phase synchronous converter into an operating low current mode when the output current is smaller than the second positive output current threshold and larger than the second negative output current threshold, wherein in the operating low current mode, the power switches are switched with a switching period which corresponds to the sampling period increased by a factor z, wherein z is larger than 1 and smaller than or equal to x, where x is the number of half bridges.

* * * * *